United States Patent
Zhou

(10) Patent No.: US 12,444,739 B2
(45) Date of Patent: *Oct. 14, 2025

(54) POSITIVE ELECTRODE PLATE AND LITHIUM-ION SECONDARY BATTERY CONTAINING SAME

(71) Applicant: Ningde Amperex Technology Limited, Fujian (CN)

(72) Inventor: Molin Zhou, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/644,652

(22) Filed: Apr. 24, 2024

(65) Prior Publication Data

US 2024/0282949 A1 Aug. 22, 2024

Related U.S. Application Data

(63) Continuation of application No. PCT/CN2021/131365, filed on Nov. 18, 2021.

(30) Foreign Application Priority Data

Oct. 25, 2021 (WO) ............... PCT/CN2021/126213

(51) Int. Cl.
*H01M 4/505* (2010.01)
*H01M 4/02* (2006.01)
(Continued)

(52) U.S. Cl.
CPC ........... *H01M 4/505* (2013.01); *H01M 4/131* (2013.01); *H01M 10/0525* (2013.01);
(Continued)

(58) Field of Classification Search
None
See application file for complete search history.

(56) References Cited

U.S. PATENT DOCUMENTS 11,114,663 B2 * 9/2021 Dai .................. C01G 51/00
12,218,312 B2 * 2/2025 Suzuki ............. H01M 4/382
(Continued)

FOREIGN PATENT DOCUMENTS

CN 1427490 A 7/2003
CN 101877417 A 11/2010
(Continued)

OTHER PUBLICATIONS

Derwent Abstract of JP 2012-2044307 A (2012) (Year: 2012).*
(Continued)

*Primary Examiner* — Kevin M Bernatz
(74) *Attorney, Agent, or Firm* — Maier & Maier, PLLC

(57) ABSTRACT

A positive electrode plate includes a positive electrode current collector and a positive electrode active material layer disposed on at least one surface of the positive electrode current collector. The positive electrode active material layer includes a first positive electrode active material $Li_{1+x}Mn_yM_{2-y}O_{4-t}A_t$ and a second positive electrode lithiation material $Li_{1+r}Mn_{1-p}N_pO_{2-s}B_s$. The positive electrode plate satisfies $1.5 \leq R \cdot P/Q \leq 30$, where R represents resistance of the positive electrode plate in $\Omega$; P represents compacted density of the positive electrode plate in $g/cm^3$; and Q represents single-sided surface density of the positive electrode plate in $g/1540.25\ mm^2$.

20 Claims, 2 Drawing Sheets

(51) Int. Cl.
*H01M 4/131* (2010.01)
*H01M 10/0525* (2010.01)
*H01M 10/0567* (2010.01)

(52) U.S. Cl.
CPC .. *H01M 10/0567* (2013.01); *H01M 2004/021* (2013.01); *H01M 2004/028* (2013.01)

(56) References Cited

U.S. PATENT DOCUMENTS

| | | | | |
|---|---|---|---|---|
| 12,308,428 | B2* | 5/2025 | Zhou | H01M 4/366 |
| 12,327,864 | B2* | 6/2025 | Zhou | H01M 10/0525 |
| 2012/0045694 | A1 | 2/2012 | Park et al. | |
| 2014/0170492 | A1* | 6/2014 | Xia | H01M 4/505 |
| | | | | 429/219 |
| 2020/0006769 | A1* | 1/2020 | Paulsen | H01M 4/525 |
| 2021/0151752 | A1* | 5/2021 | Park | H01M 10/052 |
| 2021/0159495 | A1 | 5/2021 | Li et al. | |
| 2021/0226201 | A1* | 7/2021 | Lim | H01M 4/0428 |
| 2021/0280863 | A1* | 9/2021 | Liu | H01M 10/0525 |
| 2022/0158251 | A1* | 5/2022 | Lee | H01M 50/121 |
| 2022/0190316 | A1* | 6/2022 | Seo | C01G 53/50 |
| 2022/0216460 | A1* | 7/2022 | Kuroda | H01M 4/525 |
| 2022/0223862 | A1* | 7/2022 | Wu | H01M 4/131 |
| 2022/0223904 | A1* | 7/2022 | Choi | C01G 25/006 |
| 2022/0310988 | A1* | 9/2022 | Zhou | H01M 10/0525 |
| 2022/0310998 | A1* | 9/2022 | Zhou | H01M 4/525 |
| 2022/0407064 | A1* | 12/2022 | Seo | H01M 4/505 |
| 2022/0411284 | A1* | 12/2022 | Seo | H01M 4/131 |
| 2022/0416240 | A1* | 12/2022 | Seo | H01M 4/131 |
| 2023/0053984 | A1* | 2/2023 | Seo | H01M 4/505 |
| 2023/0197959 | A1* | 6/2023 | Dong | H01M 4/485 |
| | | | | 429/221 |
| 2024/0234707 | A1* | 7/2024 | Kim | H01M 4/505 |
| 2024/0274796 | A1* | 8/2024 | Zhou | H01M 4/131 |
| 2024/0282960 | A1* | 8/2024 | Zhou | H01M 4/623 |
| 2024/0363856 | A1* | 10/2024 | Li | H01M 4/5825 |

FOREIGN PATENT DOCUMENTS

| | | |
|---|---|---|
| CN | 104037418 A | 9/2014 |
| CN | 110265627 A | 9/2019 |
| CN | 110660959 A | 1/2020 |
| CN | 110265627 B | 9/2020 |
| CN | 113036082 A | 6/2021 |
| JP | 2012204307 A * | 10/2012 |
| KR | 102172153 B1 | 10/2020 |

OTHER PUBLICATIONS

Derwent Abstract of CN 104009228 A (2014) (Year: 2014).*
Derwent Abstract of CN 114744290 A (2022) (Year: 2022).*
International Search Report issued on Sep. 2, 2022, in corresponding International Patent Application No. PCT/CN2021/131365, 5 pages.
Extended Search Report issued on Feb. 3, 2025, in corresponding European Application No. 21962114.1, 9 pages.

* cited by examiner

POSITIVE ELECTRODE PLATE AND LITHIUM-ION SECONDARY BATTERY CONTAINING SAME

CROSS REFERENCE TO RELATED APPLICATIONS

This application is a continuation application of PCT/CN2021/131365, filed on Nov. 18, 2021, which claims priority of international application No. PCT/CN2021/126213, filed on Oct. 25, 2021, the disclosure of which is hereby incorporated by reference in its entirety.

TECHNICAL FIELD

This application pertains to the field of battery technologies and relates to a positive electrode plate and a lithium-ion secondary battery containing the same.

BACKGROUND

During first-cycle charging and discharging of a lithium-ion secondary battery, a solid electrolyte interface (SEI) is formed on the surface of a negative electrode, which causes irreversible capacity loss, decreasing the energy density of a lithium-ion energy storage device. In a device using a graphite negative electrode, about 10% of an active lithium source is consumed in the first cycle. When the negative electrode is made of a negative electrode material with high specific capacity such as alloy (silicon, tin, or the like), oxide (silicon oxide or tin oxide), and amorphous carbon, more of the active lithium source is consumed. Therefore, an appropriate lithiation method is of great significance for further increasing the energy density of the lithium-ion secondary battery.

The patent CN1427490A proposes a negative electrode lithiation method. Specifically, lithium metal powder, a negative electrode material, and a non-aqueous liquid are mixed to form a slurry, and the slurry is applied onto a current collector. This method can increase the energy density of a battery but requires extremely strict control of moisture during production, increasing the process difficulty. FMC in the United States has made certain improvements to lithium powder and produces stabled lithium metal powder SLMP (stabled lithium metal powder) with better stability. However, such powder can remain stable for only a few hours in dry air, posing great safety hazards. If a wet operation is used, there are also issues in selecting a non-aqueous solvent and controlling moisture.

In view of the significant challenges faced by the negative electrode lithiation strategy, the positive electrode lithiation method that is safer and easier to operate has gained increasing attention in the industry. The patent CN104037418A discloses a positive electrode lithiation material based on lithium-oxygen compounds, lithium sources, and alkyl lithium. However, the lithium-containing compound therein has a high decomposition potential and produces oxygen and other by-products during decomposition, affecting the service life of the battery. The patent CN101877417A discloses a $Li_2NiO_2$ lithiation material. Such material has an extremely high content of free lithium on the surface, so the slurry is prone to gelation during slurry preparation, severely affecting the processability, causing continuous increase in impedance, and affecting the cycling performance.

SUMMARY

This application is intended to overcome the shortcomings in the prior art by providing a positive electrode plate and a lithium-ion secondary battery containing the same, so as to allow the lithium-ion secondary battery to have high energy density, good rate performance, and long cycle life while stabilizing a positive electrode plate and simplifying a processing method.

To achieve the foregoing objective, according to a first aspect, this application provides a positive electrode plate. The positive electrode plate includes a positive electrode current collector and a positive electrode active material layer disposed on at least one surface of the positive electrode current collector, where the positive electrode active material layer includes a first positive electrode active material and a second positive electrode lithiation material; and the positive electrode plate satisfies $1.5 \leq R \cdot P/Q \leq 30$, where R represents resistance of the positive electrode plate in $\Omega$; P represents compacted density of the positive electrode plate in $g/cm^3$; and Q represents single-sided surface density of the positive electrode plate in $g/1540.25 \text{ mm}^2$.

Preferably, the first positive electrode active material is $Li_{1+x}Mn_yM_{2-y}O_{4-t}A_t$, where $-0.1 < x < 0.2$, $1 < y \leq 2$, $0 \leq t < 0.5$, M is at least one of Ni, Fe, Zn, Mg, Al, Ti, or Zr, and A is at least one of S, N, F, Cl, or Br.

Preferably, the second positive electrode lithiation material is $Li_{1+r}Mn_{1-p}N_pO_{2-s}B_s$, where $-0.1 < r < 0.2$, $0 \leq p < 0.2$, $0 \leq s < 0.2$, N is at least one of Fe, Co, Ni, Ti, Zn, Mg, Al, V, Cr, or Zr, and B is at least one of S, N, F, Cl, or Br.

Preferably, the positive electrode plate satisfies at least one of the following characteristics:

(a) the positive electrode plate satisfies $3.0 \leq R \cdot P/Q \leq 15$;
(b) $R \leq 5\Omega$, and preferably $R \leq 2\Omega$;
(c) P satisfies $2.5 \text{ g/cm}^3 < P < 3.2 \text{ g/cm}^3$; or
(d) Q satisfies $0.3 \text{ g/1540.25 mm}^2 < Q \leq 0.55 \text{ g/1540.25 mm}^2$.

Preferably, a weight ratio of the first positive electrode active material to the second positive electrode lithiation material is first positive electrode active material:second positive electrode lithiation material=5:1-99:1. More preferably, the weight ratio of the first positive electrode active material to the second positive electrode lithiation material is first positive electrode active material:second positive electrode lithiation material=9:1-99:1.

Preferably, a weight percentage of the first positive electrode active material in the positive electrode active material is 80%-98%. More preferably, the weight percentage of the first positive electrode active material in the positive electrode active material is 85%-98%.

According to a second aspect, this application provides a lithium-ion secondary battery. The lithium-ion secondary battery includes the positive electrode plate, a negative electrode plate, a separator, and an electrolyte.

Preferably, the electrolyte includes the following constituents in weight percentage: 0.001% to 5% of vinylene carbonate and/or 0.001% to 5% of 1,3-propane sultone.

Compared with the prior art, this application has the following beneficial effects: the second positive electrode lithiation material in the positive electrode plate of this application has a very low content of free lithium on the surface, resulting in a slurry with good stability and good processability. In addition, under the synergistic effect between the first positive electrode active material and the second positive electrode lithiation material, and with the positive electrode plate limited to satisfying $1.5 \leq R \cdot P/Q \leq 30$, the obtained lithium-ion secondary battery has high energy density, good rate performance, and long cycle life.

DETAILED DESCRIPTION

Figure 1:
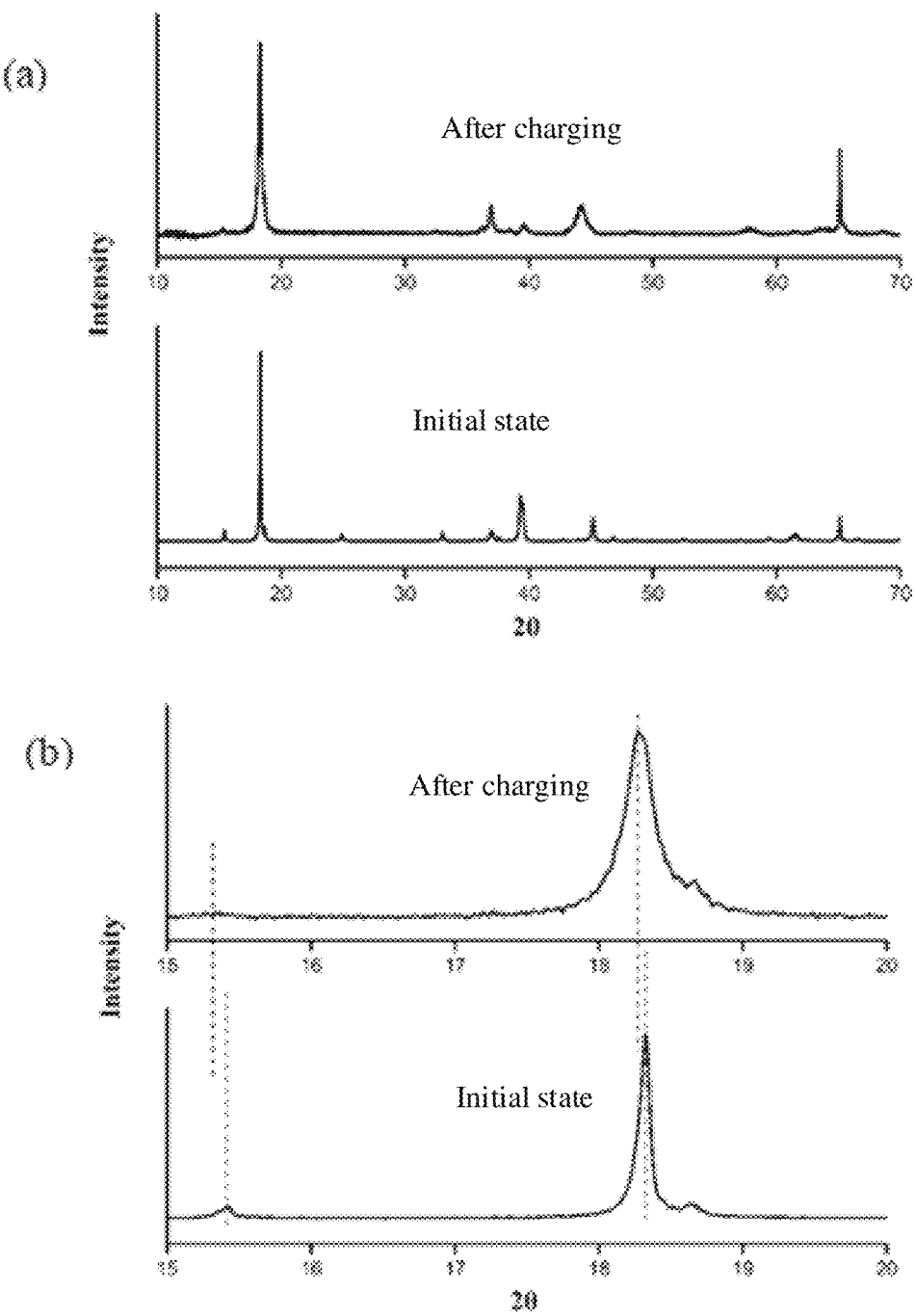
FIG. 1 shows XRD patterns of a second positive electrode lithiation material in Example 1 before and after initial charging, where FIG. (b) is a partially enlarged view of FIG. (a).
Figure 2:
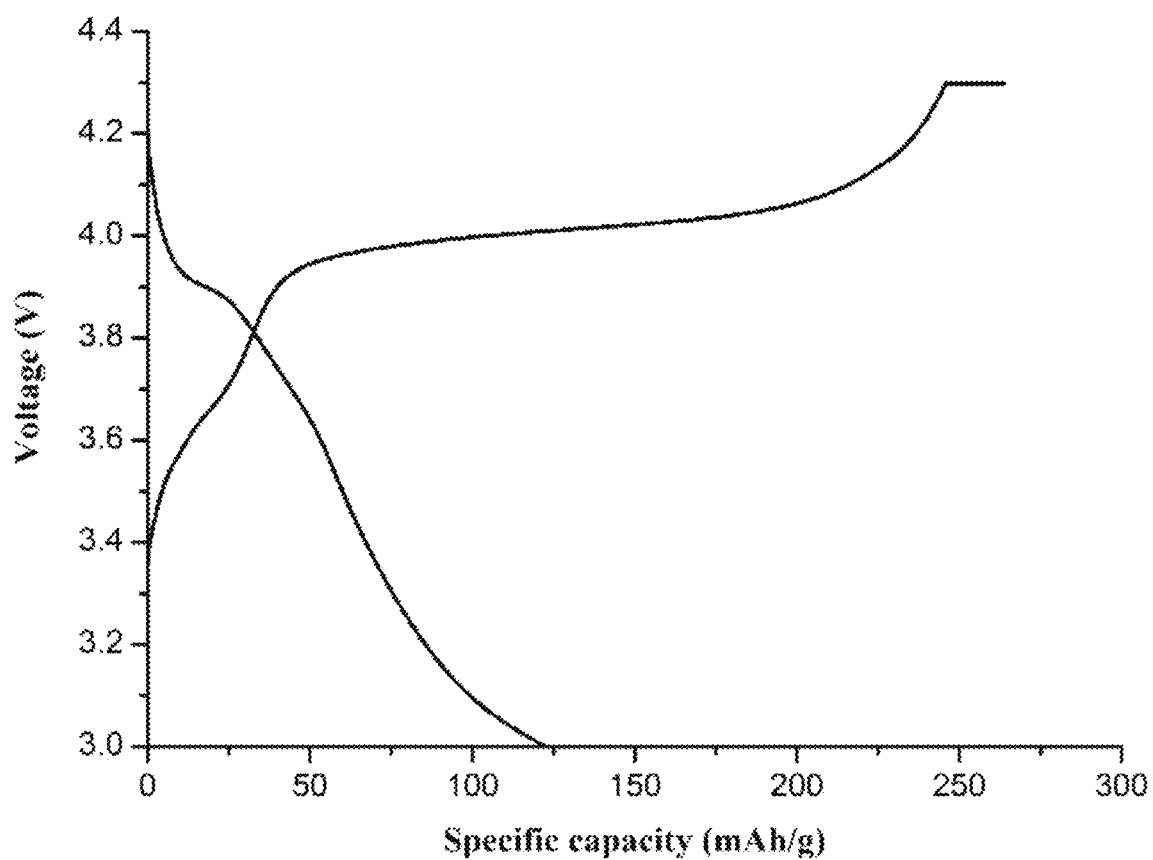
FIG. 2 shows first-cycle charge and discharge curves of the second positive electrode lithiation material in Example 1.

To better describe the objectives, technical solutions, and advantages of this application, the following further describes this application with reference to specific embodiments. Persons skilled in the art should understand that the specific embodiments described herein are merely used to explain this application but are not intended to limit this application.

In some embodiments, all test methods used are conventional methods unless otherwise specified, and all materials, reagents, and the like used are commercially available unless otherwise specified.

Positive Electrode Plate:

The positive electrode plate of this application includes a positive electrode current collector and a positive electrode active material layer disposed on at least one surface of the positive electrode current collector. In an example, the positive electrode current collector includes two back-to-back surfaces in a thickness direction of the positive electrode current collector, and the positive electrode active material layer is disposed on either or both of the two surfaces.

In the positive electrode plate of this application, the positive electrode active material layer includes a first positive electrode active material and a second positive electrode lithiation material; and the positive electrode plate satisfies $1.5 \leq R \cdot P/Q \leq 30$, where R represents resistance of the positive electrode plate in $\Omega$; P represents compacted density of the positive electrode plate in $g/cm^3$; and Q represents single-sided surface density of the positive electrode plate in $g/1540.25\ mm^2$.

The first positive electrode active material is $Li_{1+x}Mn_yM_{2-y}O_{4-t}A_t$, where $-0.1<x<0.2$, $1<y\leq 2$, $0\leq t<0.5$, M is at least one of Ni, Fe, Zn, Mg, Al, Ti, or Zr, and A is at least one of S, N, F, Cl, or Br.

The second positive electrode lithiation material is $Li_{1+r}Mn_{1-p}N_pO_{2-s}B_s$, where $-0.1<r<0.2$, $0\leq p<0.2$, $0\leq s<0.2$, N is at least one of Fe, Co, Ni, Ti, Zn, Mg, Al, V, Cr, or Zr, and B is at least one of S, N, F, Cl, or Br.

The positive electrode plate of this application uses the first positive electrode active material and second positive electrode lithiation material with specific constituents, where the first positive electrode active material has a stable structure, good cycling stability, and high initial coulombic efficiency; and the second positive electrode lithiation material has a low content of free lithium on the surface and thus has good processability. Compared with the first positive electrode active material, the second positive electrode lithiation material has higher initial charge specific capacity and lower initial discharge specific capacity, which means lower initial coulombic efficiency. During initial charging, the second positive electrode lithiation material can release a large number of lithium ions to compensate for the loss of active lithium caused by formation of a SEI. During initial discharging, sufficient lithium ions are intercalated into the first positive electrode active material, so as to increase energy density of the battery. Under the synergistic effect between the first positive electrode active material and the second positive electrode lithiation material, the lithium-ion secondary battery has effectively improved energy density, rate performance, and cycle life. Compared with a combination of a first positive electrode active substance and a second positive electrode active substance in the previously filed patent CN110265627A, the combination of the first positive electrode active material and the second positive electrode lithiation material used in this application can more significantly improve the energy density, rate performance, and cycle life of the lithium-ion secondary battery. In addition, the resistance R, compacted density P, and single-sided surface density Q of the positive electrode plate are specifically designed in this application, which can further improve the energy density, rate performance, and cycle life of the lithium-ion secondary battery, achieving organic unity of high energy density, good rate performance, and long cycle life.

To achieve the lithiation function, the second positive electrode lithiation material in this application needs to satisfy $1-p>0.8$ (that is, $0\leq p<0.2$). Specifically, the second positive electrode lithiation material in this application has two phase structures belonging to Pmmn and C2/m space groups respectively. The Pmmn space group corresponds to a characteristic diffraction peak A at 15° to 16° in a ray diffraction pattern of the second positive electrode lithiation material, and the C2/m space group corresponds to a characteristic diffraction peak B at 18° to 19° in the ray diffraction pattern of the second positive electrode lithiation material, where a ratio $I_A/I_B$ of an intensity $I_A$ of the characteristic diffraction peak A to an intensity $I_B$ of the characteristic diffraction peak B satisfies $0<I_A/I_B\leq 0.2$. After initial charging, both the characteristic diffraction peak A and the characteristic diffraction peak B shift toward lower angles, with a shift amplitude<0.5°.

In this application, the positive electrode plate needs to satisfy $1.5\leq R\cdot P/Q\leq 30$, so as to ensure that the lithium-ion secondary battery has high energy density, good rate performance, and long cycle life. In some embodiments of this application, R·P/Q is a value among 1.5, 3, 6, 9, 12, 15, 18, 21, 24, 27, 30, and the like. In some preferred embodiments of this application, R·P/Q satisfies $3.0\leq R\cdot P/Q\leq 15$, so as to allow the obtained lithium-ion secondary battery to have longer cycle life and better rate performance. For example, R·P/Q is a value among 3, 4, 5, 6, 7, 8, 9, 10, 11, 12, 13, 14, 15, and the like.

In this specification, the calculation of R·P/Q involves only numerical calculations. For example, if the resistance R of the positive electrode plate is $1.0\Omega$, the compacted density P is $3.0\ g/cm^3$, and the single-sided surface density Q of the positive electrode plate is $0.35\ g/1540.25\ mm^2$, then R·P/Q=8.57.

The resistance R of the positive electrode plate is a resistance value measured using a direct current two-probe method, where a contact area between probes and the positive electrode plate is $49\pi\ mm^2$. The resistance R of the positive electrode plate is measured using a HIOKI BT23562 internal resistance tester during research in this application. The specific operation is as follows: upper and lower sides of the positive electrode plate are clamped between two conductive terminals of the tester and are fixed by applying pressure, where a diameter of the conductive terminal is 14 mm and the applied pressure is 15 MPa-27 MPa, and then the resistance R of the positive electrode plate is measured.

The compacted density P of the positive electrode plate can be calculated according to the formula P=m/v, where in the formula, m is a weight of the positive electrode active material layer in g; and v is a volume of the positive electrode active material layer in cm³. The volume v of the positive electrode active material layer can be a product of an area $A_r$ of the positive electrode active material layer and a thickness of the positive electrode active material layer.

The single-sided surface density Q of the positive electrode plate can be calculated according to the formula Q=1540.25 m/$A_r$, where in the formula, m is a weight of the positive electrode active material layer in g; and $A_r$ is an area of the positive electrode active material layer in mm².

It should be noted that the sheet resistance R, compacted density P, and single-sided surface density Q of the positive electrode plate are the key parameters in the design and preparation of the lithium-ion secondary battery. An excessively large sheet resistance R of the positive electrode plate deteriorates the cycling performance and rate performance of the lithium-ion secondary battery. An excessively large or small compacted density P deteriorates the cycling performance and rate performance of the lithium-ion secondary battery. An excessively large single-sided surface density Q of the positive electrode plate reduces the cycle life of the lithium-ion secondary battery and affects permeation of the electrolyte, affecting the rate performance of the battery, and especially decreasing the discharge capacity of the battery at a high rate. However, an excessively small single-sided surface density Q of the positive electrode plate means that the length of the current collector and separator increases under the same battery capacity, resulting in an increased ohmic resistance of the battery. This requires the comprehensive design of these parameters during preparation of the battery to ensure that the positive electrode plate achieves the expected design values, so as to allow the lithium-ion secondary battery to achieve desired electrochemical performance.

The sheet resistance R of the positive electrode plate preferably satisfies R≤5Ω, so as to improve the cycling performance and rate performance of the lithium-ion secondary battery. The sheet resistance R of the positive electrode plate more preferably satisfies R≤2Ω, so as to further improve the cycling performance and rate performance of the lithium-ion secondary battery.

The compacted density P of the positive electrode plate preferably satisfies 2.5 g/cm³<P<3.2 g/cm³. This facilitates migration of electrons and ions in the positive electrode plate, thereby improving the cycling performance of the lithium-ion secondary battery.

The single-sided surface density Q of the positive electrode plate preferably satisfies 0.3 g/1540.25 mm²<Q<0.55 g/1540.25 mm². This can improve the cycling performance and rate performance of the lithium-ion secondary battery while guaranteeing the charge and discharge capacity.

A weight ratio of the first positive electrode active material to the second positive electrode lithiation material is preferably 5:1-99:1. The majority of such positive electrode plate is the first positive electrode active material, which has higher structural stability, reducing capacity loss and impedance increase caused by structural damage of the positive electrode active material, thereby maintaining cycling stability and kinetic performance. The weight ratio of the first positive electrode active material to the second positive electrode lithiation material is more preferably 9:1-99:1, so as to further improve the cycling stability and kinetic performance.

A weight percentage of the first positive electrode active material in the positive electrode active material is 80%-98%, and more preferably 85%-98%.

In the positive electrode plate in some embodiments of this application, the positive electrode active material layer may further include a conductive agent and a binder. The conductive agent and the binder are not limited to any specific type in this application, and may be selected depending on actual needs.

In an example, the conductive agent may be at least one of graphite, superconducting carbon, acetylene black, carbon black, Ketjen black, carbon dots, carbon nanotubes, graphene, or carbon nanofiber; and the binder may be at least one of styrene-butadiene rubber (SBR), water-based acrylic resin (water based acrylic resin), carboxymethyl cellulose (CMC), polyvinylidene fluoride (PVDF), polytetrafluoroethylene (PTFE), polyvinyl butyral (PVB), ethylene-vinyl acetate copolymer (EVA), or polyvinyl alcohol (PVA).

In some optional embodiments, a weight percentage of the conductive agent in the positive electrode active material layer is ≥0.5%, so as to obtain a low sheet resistance of the positive electrode.

In some optional embodiments, a weight percentage of the binder in the positive electrode active material layer is ≤2.0%, so as to obtain a low sheet resistance of the positive electrode.

The positive electrode current collector may be made of a metal foil material or a porous metal plate, for example, a foil material or porous plate made of metal such as aluminum, copper, nickel, titanium, or silver or alloys thereof, such as aluminum foil.

Thickness of the positive electrode current collector is preferably 5 μm-20 μm, further preferably 6 μm-18 μm, and more preferably 8 μm-16 μm.

Lithium-Ion Secondary Battery:

The positive electrode plate of this application can be used as a positive electrode of a lithium-ion secondary battery. The lithium-ion secondary battery includes a positive electrode plate, a negative electrode plate, a separator, and an electrolyte, where the positive electrode plate is the positive electrode plate of this application. The positive electrode plate of this application is used, so the lithium-ion secondary battery of this application has high energy density, good cycling performance, and good rate performance.

The negative electrode plate may be a lithium metal plate or may include a negative electrode current collector and a negative electrode active material layer disposed on at least one surface of the negative electrode current collector.

The negative electrode active material layer generally includes a negative electrode active material, a conductive agent, a binder, and a thickener. In an example, the negative electrode active material may be at least one of natural graphite, artificial graphite, mesocarbon microbeads (MCMB), hard carbon, soft carbon, silicon, silicon-carbon composite, SiO, Li—Sn alloy, Li—Sn—O alloy, Sn, SnO, SnO₂, spinel-structured lithium titanate $Li_4Ti_5O_{12}$, Li—Al alloy, or metal lithium; the conductive agent may be at least one of graphite, superconducting carbon, acetylene black, carbon black, Ketjen black, carbon dots, carbon nanotubes, graphene, or carbon nanofiber; the binder may be at least one of styrene-butadiene rubber (SBR), polyvinylidene fluoride (PVDF), polytetrafluoroethylene (PTFE), polyvinyl butyral (PVB), water-based acrylic resin (water-based acrylic resin), or carboxymethyl cellulose (CMC); and the thickener may be carboxymethyl cellulose (CMC). However, this application is not limited to these materials, and this application may alternatively use other materials that can be used as a negative electrode active material, conductive agent, binder, and thickener of a lithium-ion secondary battery.

The negative electrode current collector may be made of a material such as a metal foil material or a porous metal plate, for example, a foil material or porous plate made of metal such as copper, nickel, titanium, or iron or alloys thereof, such as copper foil.

The negative electrode plate may be prepared using a conventional method in the art. Generally, the negative electrode active material and the optional conductive agent, binder, and thickener are dispersed in a solvent to form a uniform negative electrode slurry, where the solvent may be N-methylpyrrolidone (NMP) or deionized water, and then the negative electrode slurry is applied onto the negative electrode current collector, followed by processes such as drying and cold pressing, to obtain a negative electrode plate.

The separator is not limited, and may be any well-known porous separator with electrochemical stability and chemical stability, for example, a single-layer or multi-layer film made of at least one of glass fiber, non-woven fabric, polyethylene (PE), polypropylene (PP), or polyvinylidene fluoride (PVDF).

The electrolyte includes an organic solvent, an electrolytic lithium salt, and an additive. The organic solvent and electrolytic lithium salt are not limited to any specific type in this application, and may be selected depending on actual needs.

In an example, the organic solvent may be at least one and preferably more than two of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), gamma-butyrolactone (GBL), sulfolane (SF), methyl sulfonyl methane (MSM), ethyl methanesulfonate (EMS), or diethyl sulfone (ESE).

The electrolytic lithium salt may be at least one of $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium bis(fluorosulfonyl)imide), LiTFSI (lithium bis(trifluoromethanesulfonyl)imide), LiTFS (lithium trifluoromethanesulfonate), LiDFOB (lithium difluoro(oxalato)borate), LiBOB (lithium bis(oxalato)borate), $LiPO_2F_2$ (lithium difluorophosphate), LiDFOP (lithium difluorobis(oxalato)phosphate), or LiTFOP (lithium tetrafluoro(oxalato)phosphate).

The electrolyte additive includes vinylene carbonate (VC). Based on a total weight of the electrolyte, a weight percentage of the vinylene carbonate is 0%-5% and is not 0%. The vinylene carbonate additive being added to the electrolyte promotes formation of a more uniform and denser SEI film on the negative electrode, suppressing the continuous loss of active lithium.

The electrolyte additive includes 1,3-propane sultone (PS). Based on the total weight of the electrolyte, a weight percentage of the 1,3-propane sultone is 0%-5% and is not 0%. The 1,3-propane sultone being added to the electrolyte promotes formation of an interface protective layer on the positive electrode side, further prolonging the cycle life of the lithium-ion secondary battery.

The electrolyte further optionally includes other additives. The additive may be any additive that can be used as an additive of a lithium-ion secondary battery, which is not specifically limited in this application, and may be selected depending on actual needs. In an example, the additive may further include at least one of vinylethylene carbonate (VEC), succinonitrile (SN), adiponitrile (AND), 1,3-propene sultone (PST), sulfonate cyclic quaternary ammonium salt, tris(trimethylsilyl) phosphate (TMSP), or tris(trimethylsilyl) borate (TMSB).

The electrolyte may be prepared using a conventional method in the art. The organic solvent, the electrolytic lithium salt, the vinylene carbonate, the 1,3-propane sultone, and the other optional additives may be evenly mixed to obtain the electrolyte, where the materials are not limited to a particular addition order. For example, the electrolytic lithium salt, the vinylene carbonate, the 1,3-propane sultone, and the other optional additives are added to the organic solvent and evenly mixed to obtain the electrolyte. The electrolytic lithium salt may be added to the organic solvent first, and then the vinylene carbonate, the 1,3-propane sultone, and the other optional additives are added to the organic solvent separately or simultaneously.

The positive electrode plate, the separator, and the negative electrode plate are stacked in sequence such that the separator is located between the positive electrode plate and the negative electrode plate for separation to obtain a battery cell, or the resulting stack is wound to obtain a battery cell; and the battery cell is placed in a packaging housing, the electrolyte is injected, and the housing is sealed, to obtain the lithium-ion secondary battery.

Charge and discharge curves, high-temperature cycling performance, and rate performance of the lithium-ion secondary battery are tested using the following methods during research in this application.

Charge and discharge curve test: At 45° C., the lithium-ion secondary battery is charged to 4.3 V at a constant current of 0.1 C, then charged to a current less than or equal to 0.025 C at a constant voltage, and discharged to 3.0 V at a constant current of 0.1 C, and charge and discharge curves of the lithium-ion secondary battery are recorded.

High-temperature cycling performance test: At 45° C., the lithium-ion secondary battery is charged to 4.3 V at a constant current of 1.5 C, then charged to a current less than or equal to 0.05 C at a constant voltage, and discharged to 3.0 V at a constant current of 1 C. This is one charge and discharge cycle, and a discharge capacity of the lithium-ion secondary battery after the first cycle is recorded. The lithium-ion secondary battery is subjected to charge and discharge cycles using the foregoing method, a discharge capacity after each cycle is recorded until the discharge capacity of the lithium-ion secondary battery decays to 80% of the discharge capacity after the first cycle, and the number of charge and discharge cycles is recorded.

Rate performance test: At 25° C., the lithium-ion secondary battery is charged to 4.3 V at a constant current of 0.2 C, then charged to a current less than or equal to 0.05 C at a constant voltage, and discharged to 3.0 V at a constant current of 0.2 C, and a discharge capacity at 0.2 C is recorded; and at 25° C., the lithium-ion secondary battery is charged to 4.3 V at a constant current of 0.2 C, then charged to a current less than or equal to 0.05 C at a constant voltage, and discharged to 3.0 V at a constant current of 2 C, and a discharge capacity at 2 C is recorded. Discharge capacity retention rate of lithium-ion secondary battery at 2 C (%)=discharge capacity at 2 C/discharge capacity at 0.2 C×100%.

Example 1

Preparation of positive electrode plate: A first positive electrode active material $LiMn_2O_4$, a second positive electrode lithiation material LiMnO$_2$, a binder PVDF, and conductive carbon black were mixed, where a weight ratio of LiMn$_2$O$_4$, LiMnO$_2$, PVDF, and conductive carbon black was 92.5:4.0:1.5:2.0, a solvent NMP was added at a material-to-liquid ratio of 7:3, and the mixture was stirred to a uniform transparent system under the action of vacuum stirring to obtain a positive electrode slurry; and the positive electrode slurry was uniformly applied onto a positive electrode current collector aluminum foil, and then transferred to an oven for drying at 120° C., followed by cold pressing and cutting, to obtain a positive electrode plate. A weight percentage of the first positive electrode active material LiMn$_2$O$_4$ in the positive electrode active material layer was 92.5%, and a weight percentage of the second positive electrode lithiation material LiMnO$_2$ in the positive electrode active material layer was 4.0%.

Preparation of negative electrode plate: A negative electrode active material artificial graphite, a thickener sodium carboxymethyl cellulose (CMC), a binder (SBR), and conductive carbon black were mixed at a mass ratio of 95.7:1.0:1.8:1.5, a solvent deionized water was added at a material-to-liquid ratio of 4:6, and the mixture was stirred by a vacuum stirrer to obtain a negative electrode slurry; and the negative electrode slurry was uniformly applied onto a negative electrode current collector copper foil, and then transferred to an oven for drying at 120° C., followed by cold pressing and cutting, to obtain a negative electrode plate.

Preparation of electrolyte: Ethylene carbonate (EC), ethyl methyl carbonate (EMC), and diethyl carbonate (DEC) were evenly mixed at a volume ratio of 1:1:1 to obtain an organic solvent; LiPF$_6$ was dissolved in the organic solvent such that a concentration of the LiPF$_6$ was 1 mol/L; and based on a total mass of the electrolyte, 3 wt % vinylene carbonate and 3 wt % 1,3-propane sultone were added, and the mixture was evenly mixed to obtain an electrolyte.

Preparation of lithium-ion secondary battery: The positive electrode plate, the separator, and the negative electrode plate were stacked sequentially, where the separator was a 14 μm thick polypropylene (PP) film (provided by Celgard), and the separator was located between the positive electrode plate and the negative electrode plate for separation. Then, the resulting stack was wound to form an electrode assembly. After tabs were welded, the electrode assembly was placed in a housing, the electrolyte was injected, and the housing was sealed, followed by processes such as standing, formation, and shaping, to obtain a lithium-ion secondary battery.

Examples 2 to 27

Different from Example 1, the material constituents in the positive electrode and the related parameters in the preparation steps were adjusted. See Table 1 for details. (In this table, the weight percentage of the first positive electrode active material is the weight percentage of the first positive electrode active material in the positive electrode active material, and the weight percentage of the second positive electrode lithiation material is the weight percentage of the second positive electrode lithiation material in the positive electrode active material).

Comparative Example 1

Different from Example 1, the positive electrode included only LiMn$_2$O$_4$.

Comparative Example 2

Different from Example 1, the positive electrode included only LiMnO$_2$.

Comparative Examples 3 and 4

The weight ratio of the first positive electrode active material to the second positive electrode lithiation material in the positive electrode was different from that in Example 1.

Comparative Examples 5 and 6

The sheet resistance, compacted density, and single-sided surface density of the positive electrode plate were different from those in Example 1.

Comparative Examples 7 and 8

The weight percentages of the vinylene carbonate and 1,3-propane sultone in the electrolyte were different from those in Example 1.

Comparative Examples 9 and 10

Different from Example 26, the electrolyte included only vinylene carbonate or 1,3-propane sultone.

In the examples and comparative examples, except that the percentages of the conductive carbon black and binder PVDF in the positive electrode active material were 0.5 wt % respectively in Example 18, the percentage of the conductive carbon black was 2.0 wt % and the percentage of the binder PVDF was 1.5 wt % in the positive electrode active material in the other examples and comparative examples.

High-temperature cycling performance and rate performance of the lithium-ion secondary batteries prepared in the examples and comparative examples were tested according to the foregoing methods. See Table 2 for the results.

TABLE 1

| Type | Positive electrode active material | Weight percentage of first positive electrode active material (wt %) | Weight percentage of second positive electrode lithiation material (wt %) | Sheet resistance R of positive electrode plate (Ω) | Compacted density P of positive electrode plate (g/cm$^3$) | Single-sided surface density Q of positive electrode plate (g/1540.25 mm$^2$) | Weight percentage of vinylene carbonate in electrolyte (%) | Weight percentage of 1,3-propane sultone in electrolyte (%) |
|---|---|---|---|---|---|---|---|---|
| Comparative Example 1 | LiMn$_2$O$_4$ | 96.5 | / | 0.9 | 2.8 | 0.35 | 3 | 3 |
| Comparative Example 2 | LiMnO$_2$ | / | 96.5 | 0.9 | 3.4 | 0.35 | 3 | 3 |

TABLE 1-continued

| Type | Positive electrode active material | Weight percentage of first positive electrode active material (wt %) | Weight percentage of second positive electrode lithiation material (wt %) | Sheet resistance R of positive electrode plate (Ω) | Compacted density P of positive electrode plate (g/cm$^3$) | Single-sided surface density Q of positive electrode plate (g/1540.25 mm$^2$) | Weight percentage of vinylene carbonate in electrolyte (%) | Weight percentage of 1,3-propane sultone in electrolyte (%) |
|---|---|---|---|---|---|---|---|---|
| Comparative Example 3 | LiMn$_2$O$_4$/LiMnO$_2$ | 96.0 | 0.5 | 0.9 | 2.8 | 0.35 | 3 | 3 |
| Comparative Example 4 | LiMn$_2$O$_4$/LiMnO$_2$ | 76.5 | 20.0 | 0.9 | 2.8 | 0.35 | 3 | 3 |
| Comparative Example 5 | LiMn$_2$O$_4$/LiMnO$_2$ | 92.5 | 4.0 | 2.5 | 3.2 | 0.25 | 3 | 3 |
| Comparative Example 6 | LiMn$_2$O$_4$/LiMnO$_2$ | 92.5 | 4.0 | 0.4 | 2.5 | 0.55 | 3 | 3 |
| Comparative Example 7 | LiMn$_2$O$_4$/LiMnO$_2$ | 92.5 | 4.0 | 0.9 | 2.8 | 0.35 | 0 | 0 |
| Comparative Example 8 | LiMn$_2$O$_4$/LiMnO$_2$ | 92.5 | 4.0 | 0.9 | 2.8 | 0.35 | 7 | 7 |
| Comparative Example 9 | LiMn$_2$O$_4$/LiMnO$_2$ | 92.5 | 4.0 | 0.9 | 2.8 | 0.35 | 1 | 0 |
| Comparative Example 10 | LiMn$_2$O$_4$/LiMnO$_2$ | 92.5 | 4.0 | 0.9 | 2.8 | 0.35 | 0 | 1 |
| Example 1 | LiMn$_2$O$_4$/LiMnO$_2$ | 92.5 | 4.0 | 0.9 | 2.8 | 0.35 | 3 | 3 |
| Example 2 | LiMn$_{1.8}$Ni$_{0.2}$O$_4$/LiMnO$_2$ | 92.5 | 4.0 | 0.9 | 2.8 | 0.35 | 3 | 3 |
| Example 3 | LiMn$_{1.8}$Ni$_{0.1}$Ti$_{0.1}$O$_4$/LiMnO$_2$ | 92.5 | 4.0 | 0.9 | 2.8 | 0.35 | 3 | 3 |
| Example 4 | LiMn$_{1.95}$Zr$_{0.05}$O$_{3.95}$F$_{0.05}$/LiMnO$_2$ | 92.5 | 4.0 | 0.9 | 2.8 | 0.35 | 3 | 3 |
| Example 5 | LiMn$_2$O$_4$/LiMn$_{0.9}$Ni$_{0.1}$O$_2$ | 92.5 | 4.0 | 0.9 | 2.8 | 0.35 | 3 | 3 |
| Example 6 | LiMn$_2$O$_4$/LiMn$_{0.9}$Ni$_{0.05}$Cr$_{0.05}$O$_2$ | 92.5 | 4.0 | 0.9 | 2.8 | 0.35 | 3 | 3 |
| Example 7 | LiMn$_2$O$_4$/Li$_{0.95}$MnO$_{1.95}$F$_{0.05}$ | 92.5 | 4.0 | 0.9 | 2.8 | 0.35 | 3 | 3 |
| Example 8 | LiMn$_2$O$_4$/Li$_{0.95}$MnO$_{1.9}$S$_{0.05}$F$_{0.05}$ | 92.5 | 4.0 | 0.9 | 2.8 | 0.35 | 3 | 3 |
| Example 9 | Li$_{1.1}$Mn$_{1.1}$Fe$_{0.5}$Al$_{0.4}$O$_4$/Li$_{0.92}$Mn$_{0.82}$Fe$_{0.05}$Co$_{0.05}$Ti$_{0.08}$O$_2$ | 92.5 | 4.0 | 0.9 | 2.8 | 0.35 | 3 | 3 |
| Example 10 | Li$_{0.96}$Mn$_{1.8}$Mg$_{0.1}$Zn$_{0.1}$O$_{3.7}$S$_{0.3}$/LiMn$_{0.9}$Zn$_{0.05}$Mg$_{0.03}$Al$_{0.02}$O$_{1.82}$Cl$_{0.18}$ | 92.5 | 4.0 | 0.9 | 2.8 | 0.35 | 3 | 3 |
| Example 11 | LiMn$_2$O$_{3.6}$N$_{0.2}$Br$_{0.1}$Cl$_{0.1}$/Li$_{0.95}$Mn$_{0.9}$V$_{0.05}$Zr$_{0.05}$O$_{1.9}$N$_{0.05}$Br$_{0.05}$ | 92.5 | 4.0 | 0.9 | 2.8 | 0.35 | 3 | 3 |
| Example 12 | LiMn$_2$O$_4$/LiMnO$_2$ | 80.4 | 16.1 | 0.9 | 2.8 | 0.35 | 3 | 3 |
| Example 13 | LiMn$_2$O$_4$/LiMnO$_2$ | 85 | 11.5 | 0.9 | 2.8 | 0.35 | 3 | 3 |
| Example 14 | LiMn$_2$O$_4$/LiMnO$_2$ | 86.9 | 9.7 | 0.9 | 2.8 | 0.35 | 3 | 3 |
| Example 15 | LiMn$_2$O$_4$/LiMnO$_2$ | 89.5 | 7.0 | 0.9 | 2.8 | 0.35 | 3 | 3 |
| Example 16 | LiMn$_2$O$_4$/LiMnO$_2$ | 94.5 | 2.0 | 0.9 | 2.8 | 0.35 | 3 | 3 |
| Example 17 | LiMn$_2$O$_4$/LiMnO$_2$ | 95.54 | 0.97 | 0.9 | 2.8 | 0.35 | 3 | 3 |
| Example 18 | LiMn$_2$O$_4$/LiMnO$_2$ | 98 | 1 | 0.9 | 2.8 | 0.35 | 3 | 3 |
| Example 19 | LiMn$_2$O$_4$/LiMnO$_2$ | 92.5 | 4.0 | 0.5 | 3.0 | 0.45 | 3 | 3 |
| Example 20 | LiMn$_2$O$_4$/LiMnO$_2$ | 92.5 | 4.0 | 1.5 | 3.1 | 0.32 | 3 | 3 |
| Example 21 | LiMn$_2$O$_4$/LiMnO$_2$ | 92.5 | 4.0 | 2.2 | 2.6 | 0.50 | 3 | 3 |
| Example 22 | LiMn$_2$O$_4$/LiMnO$_2$ | 92.5 | 4.0 | 5 | 3 | 0.5 | 3 | 3 |
| Example 23 | LiMn$_2$O$_4$/LiMnO$_2$ | 92.5 | 4.0 | 0.25 | 2.6 | 0.43 | 3 | 3 |
| Example 24 | LiMn$_2$O$_4$/LiMnO$_2$ | 92.5 | 4.0 | 0.9 | 2.8 | 0.35 | 1 | 1 |
| Example 25 | LiMn$_2$O$_4$/LiMnO$_2$ | 92.5 | 4.0 | 0.9 | 2.8 | 0.35 | 5 | 5 |

TABLE 1-continued

| Type | Positive electrode active material | Weight percentage of first positive electrode active material (wt %) | Weight percentage of second positive electrode lithiation material (wt %) | Sheet resistance R of positive electrode plate (Ω) | Compacted density P of positive electrode plate (g/cm³) | Single-sided surface density Q of positive electrode plate (g/1540.25 mm²) | Weight percentage of vinylene carbonate in electrolyte (%) | Weight percentage of 1,3-propane sultone in electrolyte (%) |
|---|---|---|---|---|---|---|---|---|
| Example 26 | LiMn₂O₄/LiMnO₂ | 92.5 | 4.0 | 0.9 | 2.8 | 0.35 | 0.001 | 5 |
| Example 27 | LiMn₂O₄/LiMnO₂ | 92.5 | 4.0 | 0.9 | 2.8 | 0.35 | 5 | 0.001 |

TABLE 2

| Type | R·P/Q | Cycles at high temperature | Rate performance (%) |
|---|---|---|---|
| Comparative Example 1 | 7.2 | 620 | 98.3 |
| Comparative Example 2 | 8.74 | 1 | 81.2 |
| Comparative Example 3 | 7.2 | 647 | 98.1 |
| Comparative Example 4 | 7.2 | 611 | 85.5 |
| Comparative Example 5 | 32.0 | 556 | 94.6 |
| Comparative Example 6 | 1.82 | 501 | 91.8 |
| Comparative Example 7 | 7.2 | 382 | 97.1 |
| Comparative Example 8 | 7.2 | 681 | 97.0 |
| Comparative Example 9 | 7.2 | 514 | 97.4 |
| Comparative Example 10 | 7.2 | 538 | 97.2 |
| Example 1 | 7.2 | 753 | 97.6 |
| Example 2 | 7.2 | 728 | 97.5 |
| Example 3 | 7.2 | 751 | 97.2 |
| Example 4 | 7.2 | 719 | 97.0 |
| Example 5 | 7.2 | 745 | 97.4 |
| Example 6 | 7.2 | 701 | 96.9 |
| Example 7 | 7.2 | 712 | 97.1 |
| Example 8 | 7.2 | 725 | 97.3 |
| Example 9 | 7.2 | 709 | 97.2 |
| Example 10 | 7.2 | 718 | 97.1 |
| Example 11 | 7.2 | 720 | 97.4 |
| Example 12 | 7.2 | 645 | 90.1 |
| Example 13 | 7.2 | 691 | 94.7 |
| Example 14 | 7.2 | 703 | 95.3 |
| Example 15 | 7.2 | 798 | 96.8 |
| Example 16 | 7.2 | 681 | 98.0 |
| Example 17 | 7.2 | 661 | 97.9 |
| Example 18 | 7.2 | 666 | 97.8 |
| Example 19 | 3.33 | 772 | 97.9 |
| Example 20 | 14.53 | 729 | 97.6 |
| Example 21 | 11.44 | 668 | 96.8 |
| Example 22 | 30 | 652 | 96.1 |
| Example 23 | 1.5 | 706 | 97.5 |
| Example 24 | 7.2 | 691 | 97.9 |
| Example 25 | 7.2 | 782 | 97.5 |
| Example 26 | 7.2 | 673 | 97.8 |
| Example 27 | 7.2 | 681 | 97.7 |

It can be learned from the examples and comparative examples that (1) the combination of the first positive electrode active material and the second positive electrode lithiation material produces a synergistic effect. First, the second positive electrode lithiation material used in this application has a small content of free lithium on the surface, and when it is added to the positive electrode, the obtained slurry has good stability and good processability. Second, the second positive electrode lithiation material used in this application has high initial charge specific capacity and low initial coulombic efficiency, and thus can better compensate for the loss of active lithium caused by formation of a SEI. During discharging, more lithium ions are intercalated into the lattice of the first positive electrode active material, effectively increasing the energy density of the lithium-ion secondary battery. Third, the first positive electrode active material has a stable structure and good cycling stability. Controlling the sheet resistance R, compacted density P, and single-sided surface density Q of the positive electrode plate within the ranges of this application can allow the lithium-ion secondary battery to have good cycling performance and rate performance. (2) The vinylene carbonate added to the electrolyte and the lithiation strategy of the first positive electrode active material and the second lithiation active material can generate a synergistic effect. During initial charging, a large amount of active lithium released from the second positive electrode lithiation material is intercalated into the negative electrode. This further reduces the true potential of the negative electrode, resulting in the continuous reduction of the solvent in the electrolyte, thereby affecting the cycling performance. The vinylene carbonate additive falling within the range of this application being used can facilitate formation of a denser and thinner SEI layer, which prevents the continuous consumption of the electrolyte. In addition, the 1,3-propane sultone additive is also added to the electrolyte, which can form an interface protective layer on the surface of the positive electrode active material, further improving the cycling performance.

In conclusion, it should be noted that the foregoing embodiments are merely intended to describe the technical solutions of this application, but not intended to limit the protection scope of this application. Although this application is described in detail with reference to preferred embodiments, persons of ordinary skill in the art should understand that modifications or equivalent replacements can be made to the technical solutions of this application, without departing from the essence and scope of the technical solutions of this application.

What is claimed is:

1. A positive electrode plate, comprising a positive electrode current collector and a positive electrode active material layer disposed on at least one surface of the positive electrode current collector; wherein the positive electrode active material layer comprises a first positive electrode active material and a second positive electrode lithiation material; and the positive electrode plate satisfies 1.5≤R·P/Q≤30, wherein R is a numerical value representing a resistance of the positive electrode plate (in Ω); P is a numerical value representing a compacted density of the positive electrode plate (in g/cm³); and Q is a numerical value representing a single-sided surface density of the positive electrode plate (in g/mm²), wherein Q is calculated according to Q=1540.25×m/Ar, where m is a numerical value representing a mass of the positive active material layer (in g), and Ar is a numerical value representing an area of the positive active material layer (in mm²).

2. The positive electrode plate according to claim 1, wherein the first positive electrode active material is $Li_{1+x}Mn_yM_{2-y}O_{4-t}A_t$, wherein $-0.1<x<0.2$, $1<y\leq2, 0\leq t<0.5$, M is at least one of Ni, Fe, Zn, Mg, Al, Ti, or Zr, and A is at least one of S, N, F, Cl, or Br.

3. The positive electrode plate according to claim 1, wherein the second positive electrode lithiation material is $Li_{1+r}Mn_{1-p}N_pO_{2-s}B_s$, wherein $-0.1<r<0.2, 0\leq p<0.2, 0\leq s<0.2$, N is at least one of Fe, Co, Ni, Ti, Zn, Mg, Al, V, Cr, or Zr, and B is at least one of S, N, F, Cl, or Br.

4. The positive electrode plate according to claim 1, wherein $3.0 \leq R \cdot P/Q \leq 15$.

5. The positive electrode plate according to claim 1, wherein $R \leq 5$.

6. The positive electrode plate according to claim 1, wherein $R \leq 2$.

7. The positive electrode plate according to claim 1, wherein $2.5 < P < 3.2$.

8. The positive electrode plate according to claim 1, wherein $0.3 < Q < 0.55$.

9. The positive electrode plate according to claim 1, wherein a weight ratio of the first positive electrode active material to the second positive electrode lithiation material is 5:1-99:1.

10. The positive electrode plate according to claim 5, wherein the weight ratio of the first positive electrode active material to the second positive electrode lithiation material is 9:1-99:1.

11. The positive electrode plate according to claim 1, wherein a weight percentage of the first positive electrode active material in the positive electrode active material is 80%-98%.

12. The positive electrode plate according to claim 7, wherein the weight percentage of the first positive electrode active material in the positive electrode active material is 85%-98%.

13. A lithium-ion secondary battery, comprising a positive electrode plate, a negative electrode plate, a separator, and an electrolyte, wherein the positive electrode plate comprises a positive electrode current collector and a positive electrode active material layer disposed on at least one surface of the positive electrode current collector, wherein the positive electrode active material layer comprises a first positive electrode active material and a second positive electrode lithiation material; and the positive electrode plate satisfies $1.5 \leq R \cdot P/Q \leq 30$, wherein R is a numerical value representing a resistance of the positive electrode plate (in Ω); P is a numerical value representing a compacted density of the positive electrode plate (in g/cm³); and Q is a numerical value representing a single-sided surface density of the positive electrode plate (in g/mm²), wherein Q is calculated according to Q=1540.25×m/Ar, where m is a numerical value representing a mass of the positive active material layer (in g), and Ar is a numerical value representing an area of the positive active material layer (in mm²).

14. The lithium-ion secondary battery according to claim 13, wherein the electrolyte comprises in weight percentage: 0.001% to 5% of vinylene carbonate.

15. The lithium-ion secondary battery according to claim 13, wherein the electrolyte comprises in weight percentage: 0.001% to 5% of 1,3-propane sultone.

16. The lithium-ion secondary battery according to claim 13, wherein $3.0 \leq R \cdot P/Q \leq 15$.

17. The lithium-ion secondary battery according to claim 13, wherein $2.5 < P < 3.2$.

18. The lithium-ion secondary battery according to claim 13, wherein $R \leq 2$.

19. The lithium-ion secondary battery according to claim 13, wherein a weight ratio of the first positive electrode active material to the second positive electrode lithiation material is 5:1-99:1.

20. An electronic apparatus, comprising the lithium-ion battery according to claim 13.

* * * * *